(12) United States Patent
Bennett

(10) Patent No.: US 6,217,742 B1
(45) Date of Patent: Apr. 17, 2001

(54) CATHODIC PROTECTION SYSTEM

(76) Inventor: Jack E. Bennett, 10039 Hawthorn Dr., Chardon, OH (US) 44024

( * ) Notice: Subject to any disclaimer, the term of this patent is extended or adjusted under 35 U.S.C. 154(b) by 0 days.

(21) Appl. No.: 09/451,173

(22) Filed: Nov. 30, 1999

Related U.S. Application Data

(63) Continuation-in-part of application No. 09/236,731, filed on Jan. 25, 1999, now Pat. No. 6,033,553, which is a continuation-in-part of application No. 08/839,292, filed on Apr. 17, 1997, and a continuation-in-part of application No. 08/731,248, filed on Oct. 11, 1996, now abandoned.

(51) Int. Cl.$^7$ ..................................................... C23F 13/00
(52) U.S. Cl. ................ 205/734; 204/196.01; 204/196.1; 204/196.18; 204/196.19; 204/196.25
(58) Field of Search .................................... 205/734, 730; 204/196.01, 196.1, 196.18, 196.19, 196.25

(56) References Cited

U.S. PATENT DOCUMENTS

| | | | |
|---|---|---|---|
| 5,183,694 | 2/1993 | Webb | 428/67 |
| 5,254,228 | 10/1993 | Westhof et al. | 204/147 |
| 5,364,511 | 11/1994 | Moreland et al. | 204/196 |
| 5,431,795 | 7/1995 | Moreland et al. | 252/503 |
| 5,650,060 | 7/1997 | Huang et al. | 205/730 |
| 5,750,276 | 5/1998 | Page | 428/703 |
| 6,022,469 | * 2/2000 | Page | 205/734 |

OTHER PUBLICATIONS

Bennett paper entitled "Chemical Enhancement of Metallized Zinc Anode Performance", presented at the NACE Conference in San Diego, California on Mar. 25, 1998 (Corrison '98).

* cited by examiner

*Primary Examiner*—Bruce F. Bell
(74) *Attorney, Agent, or Firm*—Tarolli, Sundheim, Covell, Tummino & Szabo L.L.P.

(57) ABSTRACT

The present invention relates to a method of cathodic protection of reinforced concrete, and more particularly, to a method of improving the performance and service life of discrete anodes used in a cathodic protection system. The method of the present invention comprises placing an embeddable discrete anode in, or on, the reinforced concrete member. The discrete anode is then embedded in a cementitous grout or mortar to encapsulate the anode and provide contact to complete the cathodic protection circuit. A lithium salt selected from the group consisting of lithium nitrate ($LiNO_3$), lithium bromide (LiBr), and combinations thereof, is added to the cementitous grout or mortar surrounding the discrete anode, in the amount of at least about 0.2 gram (dry basis) per cubic centimeter of grout or mortar. The lithium salt functions to enhance the performance of the cathodic protection system by minimizing the deleterious effects of the anode reaction product on the grout or mortar adjacent to the anode. The use of the lithium salt as taught by the present invention results in lower operating voltage and longer service life.

20 Claims, 1 Drawing Sheet

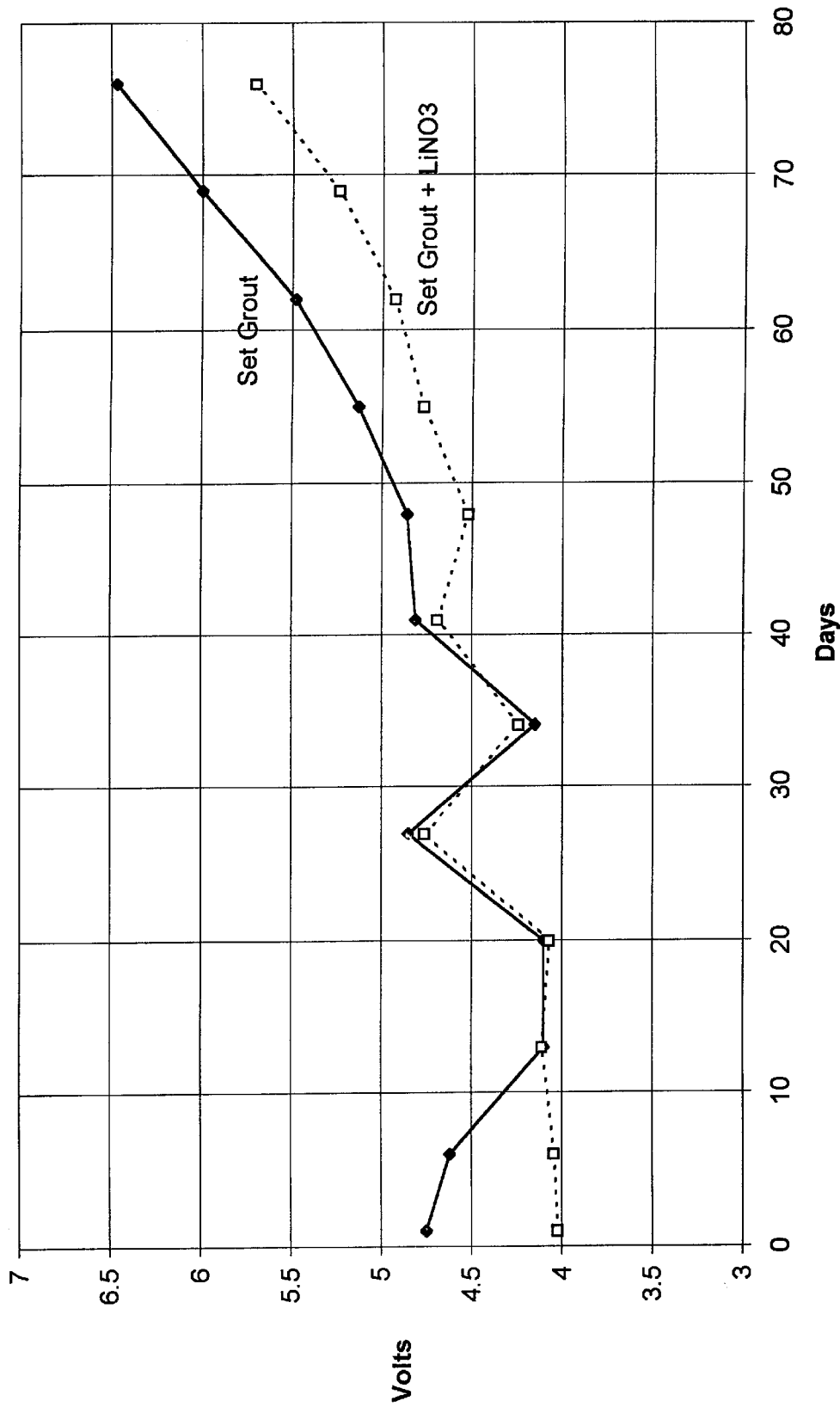

CATHODIC PROTECTION SYSTEM

This application is a continuation-in-part of prior application Ser. No. 09/236,731 filed Jan. 25, 1999, now U.S. Pat. No. 6,033,553 which in turn was a continuation-in-part of parent application Ser. No. 08/731,248 filed Oct. 11, 1996 now abandoned and Ser. No. 08/839,292 filed Apr. 17, 1997, pending.

BACKGROUND OF THE INVENTION

1. Technical Field

This invention relates generally to the field of cathodic protection systems for steel-reinforced concrete structures, and is particularly concerned with the performance of cathodic protection systems utilizing discrete anode elements embedded in cementitious grout or mortar.

2. Description of the Prior Art

The problems associated with corrosion-induced deterioration of reinforced concrete structures are now well understood. Steel reinforcement has generally performed well over the years in concrete structures such as bridges, buildings, parking structures, piers, and wharves, since the alkaline environment of concrete causes the surface of the steel to "passivate" such that it does not corrode. Unfortunately, since concrete is inherently somewhat porous, exposure to salt results in the concrete over a number of years becoming contaminated with chloride ions. Salt is commonly introduced to the concrete in the form of seawater, set accelerators or deicing salt.

When the chloride contamination reaches the level of the reinforcing steel, it destroys the ability of the concrete to keep the steel in a passive, or non-corrosive state. It has been determined that a chloride concentration of 0.6 Kg per cubic meter of concrete is a critical value above which corrosion of steel can occur. The products of corrosion of the steel occupy 2.5 to 4 times the volume of the original steel, and this expansion exerts a tremendous tensile force on the surrounding concrete. When this tensile force exceeds the tensile strength of the concrete, cracking and delaminations develop. With continued corrosion, freezing and thawing, and traffic pounding, the utility or the integrity of the structure is finally compromised and repair or replacement becomes necessary. Reinforced concrete structures continue to deteriorate at an alarming rate today. In a recent report to Congress, the Federal Highway Administration reported that of the nation's 577,000 bridges, 226,000 (39% of the total) were classified as deficient, and that 134,000 (23% of the total) were classified as structurally deficient. Structurally deficient bridges are those that are closed, restricted to light vehicles only, or that require immediate rehabilitation to remain open. The damage on most of these bridges is caused by corrosion of reinforcing steel. The United States Department of Transportation has estimated that $90.9 billion will be needed to replace or repair the damage on these existing bridges.

Many solutions to this problem have been proposed, including higher quality concrete, improved construction practices, increased concrete cover over the reinforcing steel, specialty concretes, corrosion inhibiting admixtures, surface sealers, and electrochemical techniques such as cathodic protection and chloride removal. Of these techniques, only cathodic protection is capable of controlling corrosion of reinforcing steel over an extended period of time without complete removal of the salt contaminated concrete.

Cathodic protection reduces or eliminates corrosion of the steel by making it the cathode of an electrochemical cell. This results in cathodic polarization of the steel, which tends to suppress oxidation reactions (such as corrosion) in favor of reduction reactions (such as oxygen reduction). Cathodic protection was first applied to a reinforced concrete bridge deck in 1973. Since then, understanding and techniques have improved, and today cathodic protection has been applied to over one million square meters of concrete structure worldwide. Anodes, in particular, have been the subject of much attention, and several types of anodes have evolved for specific circumstances and different types of structures.

One type of anode that has been utilized for cathodic protection of reinforced concrete structures is catalyzed titanium. The most common configuration of catalyzed titanium anode has been a highly expanded mesh of chemically pure titanium, which is catalyzed by a thin surface coating of precious metal or mixed metal oxides. The anode mesh strands are generally less than about 1⅓ inches (3 centimeters) apart. This type of anode has been especially successful for protection of reinforced concrete decks, in which case the anode is fastened to the top concrete surface and overlaid by typically 1–4 inches (2.5–10 centimeters) of fresh concrete. This is known as a distributed anode system since it essentially covers the entire surface of the structure being protected. The fresh concrete overlay serves both to encapsulate the anode and provide a new riding surface for the concrete deck. Approximately 10,000,000 square feet (100,000 square meters) of catalyzed titanium anode have been installed in this way, and such systems have generally provided a long and trouble-free service life.

Another form of catalyzed titanium anode that has been used extensively consists of a pure titanium ribbon, 0.5–0.75 inch (1.25–1.9 centimeters) wide by typically 250 ft (63 meters) long, which is also catalyzed by a thin surface coating of precious metal or mixed metal oxides. The titanium ribbon anode may be flat, or more commonly, it may be expanded to increase surface area and provide a better bond to the concrete. This type of ribbon mesh anode has typically been installed in slots 0.5 inch (1.25 centimeters) wide by 0.75 inch (1.9 centimeters) deep, cut into the top surface of a concrete deck. The slots are typically spaced 12 inches (30.5-centimeters) apart. This type of cathodic protection is therefore referred to as a "slotted" system. After the catalyzed titanium anode has been placed in the slot, the slot is backfilled with a cementitious grout or mortar to encapsulate the anode ribbon and provide a flat riding surface. This type of slotted system has been particularly advantageous for cathodic protection of reinforced concrete parking garage decks, since it can be installed without loss of headroom in the garage and without imposing additional dead weight on the structure.

However, these slotted systems have not been generally successful. After a period of use, the grout in the slots becomes stained by an acidic liquid, and the grout appears dark and wet. This acidic liquid attacks the cement paste and causes deterioration of the grout or mortar surrounding the anode. In extreme cases, this liquid has completely destroyed the grout, leaving the anode fully exposed. In other cases, the liquid has damaged and penetrated the concrete deck. Such attack has caused the voltage of the cathodic protection system to rise, and in time adequate protective current could not be supplied within the compliance voltage of the power supply. It has been speculated that such failures have occurred in non-distributed slotted systems because the cathodic protection current is confined to a relatively small area, thus concentrating the acidic anode reaction products to a small volume of concrete grout. This is in contrast to the more successful highly expanded mesh anode, which effectively distributes the current and the anodic reaction products over a much larger area.

The catalyzed titanium ribbon anode has also been used in another type of non-distributed system or discrete anodes. In this case, a hole, typically 0.75–1 inch (1.9–2.5 centimeters) in diameter and 6–24 inches (15.2–61 centimeters) long is drilled into the concrete member. The hole is filled with cementitous grout or mortar and the catalyzed titanium anode is inserted into the fresh grout or mortar. This system is claimed to be advantageous for larger concrete members such as columns and beams.

But these discrete anodes suffer the same problems as slotted systems. The acidic anode reaction products are confined to a relatively small area surrounding the anode, and eventually cause damage to the cementitous grout or mortar, which in turn causes the system voltage to escalate. The exact cause of this phenomenon is not known, but is generally thought to be due to acidic destruction of the cement paste surrounding the anode followed by a rapid escalation in resistance near the anode-grout interface. Failures are not believed to be due to anode drying out, as the anode-concrete interface can be observed to remain wet.

SUMMARY OF THE INVENTION

The present invention relates to a method of cathodic protection of reinforced concrete, and more particularly, to a method of improving the performance and service life of discrete anodes used in a cathodic protection system. The term "discrete anodes" as used herein refers to embedded anodes comprised of individual elements that are spaced apart from one another, as opposed to distributed anodes that essentially cover the entire concrete structure surface.

The method of the present invention comprises placing an embeddable discrete anode in, or on, the reinforced concrete member. The discrete anode is then embedded in a cementitous grout or mortar to encapsulate the anode and provide contact to complete the cathodic protection circuit.

A lithium salt selected from the group consisting of lithium nitrate (LiNO3), lithium bromide (LiBr), and combinations thereof, is added to the cementitous grout or mortar surrounding the discrete anode. The lithium salt functions to enhance the performance of the cathodic protection system by minimizing the deleterious effects of the anode reaction product on the grout or mortar adjacent to the anode. The use of the lithium salt as taught by the present invention results in a lower operating voltage and longer service life.

The lithium salt is added to the cementitous grout or mortar at a concentration of at least 0.2 gram (dry basis) per cubic centimeter of grout or mortar.

The present invention also resides in a reinforced concrete structure comprising at least one discrete anode embedded in a grout or mortar prepared according to the method of the present invention.

BRIEF DESCRIPTION OF THE DRAWINGS

Further features of the present invention will become apparent to those skilled in the art to which the present invention relates from reading the following specification with references to the accompanying drawing, in which:

FIG. 1 is a graph showing voltage versus time for two blocks containing ELGARD™ 100 (catalyzed titanium) Anode Ribbon Mesh anodes installed in slots and operated at an accelerated current density of 4.2 milliamps per foot (about four times design current rating). For one block, the ribbon anode was embedded in Set Grout™ (manufactured by Master Builders, Inc.) prepared by the addition of 17% by weight lithium nitrate solution. This resulted in a lithium nitrate concentration of about 1.0 gram per cubic centimeter of grout. For the other block, the ribbon anode was embedded in Set Grout™ prepared without lithium nitrate additive. Both blocks were operated outdoors in northeast Ohio for 76 days.

DESCRIPTION OF PREFERRED EMBODIMENTS

The present invention relates broadly to all reinforced concrete structures with which cathodic protection systems are useful.

Generally, the reinforcing metal in a reinforced concrete structure is carbon steel. However, other ferrous-based metals can also be used.

The cathodic protection system of the present invention relates to discrete anodes. The term "discrete anodes" is a term of art. A discrete anode system is comprised of individual anode elements which are spaced apart from one another. The elements can be in slots in the concrete structure, holes in the concrete structure, or in patched areas in the concrete structure. The anode elements are embedded in a cementitous grout or mortar. Multiple anode elements are typically connected together to operate in a parallel electric circuit to distribute protective current to the structure.

One type of discrete anode is a pure titanium ribbon, 0.5–0.75 inch (1.25–1.9 centimeters) wide by typically 250 ft (63 meters) long, which is catalyzed by a thin surface coating of precious metal or mixed metal oxides. The titanium ribbon anode may be flat, or more commonly, it may be expanded to increase surface area and provide a better bond to the concrete. An example is ELGARD™ 100 (catalyzed titanium) Anode Ribbon Mesh. The diamond openings in the mesh are very small, for instance about a millimeter across. This type of ribbon mesh anode has typically been installed in slots 0.5 inch (1.25 centimeters) wide by 0.75 inch (1.9 centimeters) deep, cut into the top surface of a concrete deck. The slots are typically spaced 12 inches (30.5-centimeters) apart. It is impractical to form slots in the surface of a concrete structure which are closer than 12 inches (30.5 centimeters) apart. After the catalyzed titanium anode has been placed in the slot, the slot is backfilled with a cementitous grout or mortar to encapsulate the anode ribbon and provide a flat riding surface.

Another type of discrete anode is a titanium ribbon anode installed in a hole, typically 0.75–1 inch (1.9–2.5 centimeters) in diameter and 6–24 inches (15.2–61 centimeters) long, drilled into the concrete member. As with the slotted system, the holes typically are on 12 inch (30.5 centimeters) centers. It is impractical to drill holes in a concrete structure which are closer together than 12 inches (30.5 centimeters). The hole is filled with cementitous grout or mortar and the anode is inserted into the fresh grout or mortar.

Another type of discrete anode is contemplated in which a discrete anode element, such as a titanium ribbon anode, is inserted into a patch in the concrete where reinforcing steel corrosion has taken place, and where delaminated and chloride-contaminated concrete has been removed. The discrete anode thus utilized is intended to provide localized cathodic protection to reinforcing steel in the immediate area of the patch.

As with the slotted or hole-type anode system, if more than one discrete anode is used, the anodes are typically placed on 12 inch (30.5 centimeters) centers. If the anodes are closer together, for instance on centers which are four inches (10 centimeters) or less apart, then the system is likely to have characteristics more akin to a distributed anode system, and the method of the present invention is not needed.

Other configurations of a discrete anode may be contemplated by those skilled in the art, but in every case the anode consists of discrete elements separated from one another by a spacing of at least several centimeters (ten or more), as distinguished from anodes which essentially cover the entire surface of the structure, and each element is configured within a relatively small, confined area, often substantially or completely surrounded by the reinforced concrete structure.

The composition of these anodes may include catalyzed titanium, titanium suboxide, or sacrificial metals such as zinc, aluminum, or alloys thereof.

Whatever its composition, the discrete anode is embedded in a cementitous grout or mortar to encapsulate the anode and is provided with electrical contact to complete the cathodic protection circuit. A flowable grout is typically used for horizontal applications, whereas a thick trowelable mortar is typically used for vertical and overhead applications. The grout or mortar is typically supplied as a powder, and is mixed on site with water or solution supplied by the manufacturer. The grout or mortar must have a low volumetric resistivity to permit operation of the cathodic protection system at a reasonable voltage. Several such grouts and mortars are commercially available and are well known to those skilled in the art.

When the discrete anodes of the present invention are inert, they are typically connected together to operate in a parallel electrical circuit, the anodes being connected to the positive pole of a power supply, and the reinforcing steel of the structure connected to the negative pole of the power supply.

When the discrete anodes are sacrificial, they may be locally or remotely connected directly to the surrounding reinforcing steel. In this case, the protective current flows spontaneously since the electrochemical reactions that cause current flow are thermodynamically favored, and no power supply is needed.

In the present invention, a lithium salt selected from the group consisting of lithium nitrate (LiNO3), lithium bromide (LiBr), and combinations thereof, is added to the encapsulating grout or mortar. The lithium salt may be incorporated into the dry mix prior to hydration, or may be added to the water or solution that is added to the mix prior to placement. The latter is especially advantageous since these lithium salts are both readily available and economical when supplied as aqueous solutions. Lithium nitrate would typically be the preferred salt for use with inert anodes and lithium bromide would typically be the preferred salt for use with sacrificial anodes, although both lithium salts can be advantageous for either type of discrete anode.

The amount of lithium salt required varies depending on the type of anode, the type of grout, the current density, and the geometry of the structure. Broadly, the amount of lithium salt required is that needed to facilitate the transport of anode reaction products and to maintain a relatively low system operating voltage. Preferably, the amount of lithium salt required is about 0.2 to 2.0 grams (dry basis) per cubic centimeter of hardened grout or mortar. The preferred range of lithium salt is about 0.4 to 1.2 grams per cubic centimeter. If too little lithium salt is used, the desired result will not be achieved. If too much lithium salt is used, this will result in an additional expense for no benefit. One gram per cubic centimeter of grout is about 14 molar; 0.2 gram per cubic centimeter of grout is about 2.9 molar.

When the cathodic protection system is connected to the reinforcing steel of the concrete structure, lithium ions migrate to the reinforcing steel. However, in the present invention, the amount of lithium ions in the grout or mortar is sufficient that depletion of lithium ions from the vicinity of the discrete anodes is negligible.

The use of lithium salts as taught by the present invention has been found to mitigate the harmful effects of anode reaction products. Bleeding of acidic liquid to the concrete surface and subsequent deterioration of surrounding grout and concrete has been found to be delayed. The rise in system voltage associated with such deterioration has been found to be diminished. The lithium salts of the present invention are thought to be unique in this regard. The same benefit is not realized by the addition of chloride salts, for example. The reasons for the effectiveness of lithium salts to enhance the performance of discrete anodes are not fully understood.

Although not to be held to any theory, it is thought that a high concentration of lithium salts near the anode-concrete interface produces a region of high conductivity and high diffusion rate, facilitating the migration of anode reaction products away from the anode-concrete interface. If anode reaction products are not allowed to concentrate, they will be less likely to destroy the cement paste by dissolution of calcium hydroxide, followed by channeling of acidic liquid along the anode and through cracks. The property of lithium salts for promoting the retention of moisture may possibly be a factor, but is not thought to be critical since these areas are observed to remain wet in any case.

It may be advantageous to also add certain agents to improve the effectiveness of the lithium salts. For example, it may be advantageous to include a wetting agent or surface active agent in the lithium salt solution. The wetting agent or surface active agent is conveniently added to the water or liquid prior to mixing with the dry grout or mortar mix. The wetting agent or surface active agent assists in the wetting and migration of anode reaction products away from the anode-concrete interface. Soaps, alcohol, fatty acids and detergents are effective wetting agents.

A large number of surface active agents are commercially available. The surface active agent should be one which has good wettability characteristics and preferably is one which is soluble in water or other polar solvent. A preferred surface active agent is a cationic amine or ammonium compound. Surface active agents generally have a hydrophobic portion, usually including a long hydrocarbon chain, and a hydrophilic portion which renders the compound soluble in water or other polar solvent. In a cationic surface active agent, the hydrophilic portion of the molecule carries a positive charge which is responsible for the surface active properties. Examples of cationic surface active agents are amine acetates, alkyl trimethyl ammonium chlorides, dialkyl dimethyl ammonium chlorides, alkyl pyridinium chlorides and lauryl dimethyl benzyl ammonium chloride.

A cationic surface active agent that has been found to be particularly useful in the present invention includes the following combination of ingredients:

| | |
|---|---|
| n-alkyl (50% $C_{14}$, 40% $C_{12}$, 10% $C_{16}$) dimethyl benzyl ammonium chloride | 80 ppm |
| Octyl decyl dimethyl ammonium chloride | 12.5 ppm |
| Dioctyl dimethyl ammonium chloride | 6.25 ppm |
| Didecyl dimethyl ammonium chloride | 6.25 ppm |

This cationic surface active agent is marketed by Lysol® as their deodorizing cleanser. It is disclosed in U.S. Pat. Nos. 5,454,984 and 5,522,942. Another surface active agent found to be effective is "SPRAY AND WASH" marketed by Dow Brands, Indianapolis, Ind.

Preferably, the surface active agent is used in the amount of at least about 50 ppm active agent in the water or liquid added to the dry grout or mortar to hydrate the grout or mortar, more preferably about 100 to about 1,000 ppm. About 0.2 to about 2% by volume Lysol® deodorizing cleanser, more preferably about 1%, was found to work well.

It may also be advantageous to add an alkali metal hydroxide to the grout or mortar. The excess alkali so added will neutralize acid produced at the anode, and forestall the deleterious effects of the acid on the cementitous grout or mortar.

EXAMPLE I

Two concrete blocks were constructed with dimensions of 12×12×4 inches (30.5×30.5×10.2 centimeters). Each block contained four 9 inch (22.9 centimeters) long No. 6 (1.9 centimeters diameter) reinforcing bars spaced on 3 inch (7.6 centimeters) centers. There was a 1 inch (2.54 centimeters) depth of cover measured from the working surface of the block. The reinforcing bars were electrically connected forming a grid. Chloride was admixed into the concrete to achieve a total (acid soluble) chloride concentration of 20 pounds per cubic yard (about 0.52% chloride by weight of concrete). The mix proportions of the concrete were as follows:

| | |
|---|---|
| Type 1 Portland Cement (Essroc) | 715 lb/yd³ (425 kg/m³) |
| Frank Road Sand Fine Aggregate | 1010 lb/yd³ (600 kg/m³) |
| No. 57 American Aggregates Limestone | 1830 lb/yd³ (1090 kg/m³) |
| Water | 285 lb/yd³ (170 kg/m³) |
| Air | About 6% |

Following a 24-hour mold curing period, the blocks were placed in a controlled temperature/humidity room maintained at 100% relative humidity and 74° F. (23° C.) where they remained for 28 days.

A 0.5 inch wide×0.75 inch deep (1.25 centimeters wide× 1.9 centimeters deep) slot was cut on the top of each block, positioned parallel to, and midway between the reinforcing bars. An ELGARD™ 100 Anode Ribbon Mesh (discrete catalyzed titanium anode) was then placed in each slot.

The slot of one block was filled with Set Grout™ by Master Builders, Inc. to completely encapsulate the anode ribbon mesh. The Set Grout™ was prepared by mixing the dry grout with 17% water by weight of dry mix.

The slot of the other block was filled with Set Grout™ prepared by mixing the dry grout with lithium nitrate solution to the amount of 17% by weight of dry mix. The lithium nitrate solution contained about 360 grams per liter of lithium nitrate and 1% by volume Lysol® deodorizing cleanser. The grout thus prepared was placed in the slot to completely encapsulate the anode ribbon mesh. After curing, the hardened grout contained about 1 gram of lithium nitrate per cubic centimeter of grout. The blocks were then wrapped in plastic for two weeks for wet curing of the grout.

After curing, the anodes and reinforcing steel were connected to a power supply and energized at a constant current of 4.2 milliamps. This current is 4.2 times the design current of the ELGARD™ 100 (catalyzed titanium) Anode Ribbon Mesh. This is therefore an accelerated test designed to hasten deterioration due to anode reaction product. Both blocks were maintained at this current density outdoors in northeast Ohio from July to September 1999. Voltage between the anodes and reinforcing steel was recorded weekly, and is shown as a function of time on FIG. 1. The rise and fall of voltages shown on FIG. 1 is due in part to the natural outdoor variations in temperature and moisture content.

After 76 days on line, the block prepared with Set Grout™ had a large amount of acidic liquid bleeding through the upper surface of the grout on about half of the slot length. The grout on this block looked dark and moist. A significant increase in voltage was noted, as shown on FIG. 1.

The block prepared with Set Grout™ doped with the lithium nitrate solution looked unchanged, however, and showed no evidence of bleeding or wetness. This treated block also showed an increase in voltage, as shown by FIG. 1, but not nearly as great as the untreated block.

This example confirmed that the addition of lithium nitrate greatly enhances the performance of discrete catalyzed titanium anodes embedded in a cementitious grout.

From the above description of the invention, those skilled in the art will perceive improvements, changes and modifications. Such improvements, changes and modifications within the skill of the art are intended to be covered by the appended claims.

Having described the invention, the following is claimed:

1. A method of cathodic protection of reinforced concrete comprising the steps of:
   (1) applying at least one discrete anode to said reinforced concrete;
   (2) embedding said discrete anode in a cementitious grout or mortar;
   (3) said cementitious grout or mortar having distributed therein a lithium salt selected from the group consisting of lithium nitrate, lithium bromide, and combinations thereof, in the amount of at least 0.2 gram (dry basis) per cubic centimeter of grout or mortar; and
   (4) causing or allowing current to flow between said anode and reinforcing steel such that the steel is cathodically protected.

2. The method of claim 1 comprising multiple discrete anodes.

3. The method of claim 2 wherein said discrete anodes are contained within slots in a surface of the concrete and the slots are filled with said cementitious grout or mortar.

4. The method of claim 2 wherein said discrete anodes are contained within holes in said concrete and said holes are filled with said cementitous grout or mortar.

5. The method of claim 2 wherein said anodes are zinc, aluminum, or titanium.

6. The method of claim 1 wherein the concentration of lithium salt in the grout or mortar is in the range of about 0.4 to about 1.2 grams per cubic centimeter.

7. The method of claim 1 wherein the concentration of lithium salt is effective to produce a region of high conductivity and diffusion rate near the anode concrete interface facilitating the migration of anode reaction products away from the interface.

8. The method of claim 1 wherein said cementitous grout or mortar also comprises a surface active agent distributed therein.

9. The method of claim 8 wherein said surface active agent is a cationic amine or ammonium compound.

10. The method of claim 9 wherein said lithium salt and surface active agent are added to a carrying medium to form a dispersion or suspension and said dispersion or suspension is added to a mix of said grout or mortar prior to placement of the grout or mortar about said discrete anode.

11. A cathodic protection system for the protection of reinforced concrete prepared according to the steps comprising:

(1) applying at least one discrete anode to said reinforced concrete;

(2) embedding said discrete anode in a cementitous grout or mortar;

(3) said cementitous grout or mortar having distributed therein a lithium salt selected from the group consisting of lithium nitrate, lithium bromide, and combinations thereof, in the amount of at least 0.2 gram (dry basis) per cubic centimeter of grout or mortar; and (4) causing or allowing current to flow between said anode and reinforcing steel such that the steel is cathodically protected.

12. A cathodic protection system for a reinforced concrete structure comprising:

(1) at least one discrete anode affixed to said reinforced concrete structure;

(2) a cementitous grout or mortar encapsulating said discrete anode;

(3) said grout or mortar having distributed therein a lithium salt selected from the group consisting of lithium nitrate, lithium bromide, and combinations thereof in the amount of at least 0.2 gram (dry basis) per cubic centimeter of grout or mortar.

13. The system of claim 12 comprising multiple discrete anodes.

14. The system of claim 13 wherein said discrete anodes are contained within slots in a surface of the concrete and the slots are filled with said cementitous grout or mortar.

15. The system of claim 13 wherein said discrete anodes are contained within holes in said concrete and said holes are filled with said cementitous grout or mortar.

16. The system of claim 13 wherein said anodes are zinc, aluminum, or titanium.

17. The system of claim 12 wherein the concentration of lithium salt in the grout or mortar is in the range of about 0.4 to about 1.2 grams per cubic centimeter.

18. The system of claim 12 wherein the concentration of lithium salt is effective to produce a region of high conductivity and diffusion rate near the anode concrete interface facilitating the migration of anode reaction products away from the interface.

19. The system of claim 12 wherein said cementitous grout or mortar also comprises a surface active agent distributed therein.

20. The system of claim 19 wherein said surface active agent is a cationic amine or ammonium compound.

\* \* \* \* \*